(12) United States Patent
Kobae

(10) Patent No.: US 8,517,277 B2
(45) Date of Patent: Aug. 27, 2013

(54) RADIO FREQUENCY IDENTIFICATION TAG AND METHOD OF MANUFACTURING THE SAME

(75) Inventor: Kenji Kobae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 12/503,112

(22) Filed: Jul. 15, 2009

(65) Prior Publication Data

US 2010/0051703 A1 Mar. 4, 2010

(30) Foreign Application Priority Data

Aug. 26, 2008 (JP) ................................ 2008-216205

(51) Int. Cl.
*G06K 7/00* (2006.01)

(52) U.S. Cl.
USPC .......................................... 235/492; 235/487

(58) Field of Classification Search
USPC ................................................. 235/487, 492
See application file for complete search history.

(56) References Cited

U.S. PATENT DOCUMENTS

| | | | |
|---|---|---|---|
| 6,903,704 B2* | 6/2005 | Forster et al. ................ | 343/806 |
| 7,363,704 B2 | 4/2008 | Kobayashi et al. | |
| 2005/0009484 A1* | 1/2005 | Imai et al. ..................... | 455/144 |
| 2006/0001138 A1 | 1/2006 | Sakama et al. | |
| 2007/0040028 A1* | 2/2007 | Kawamata ..................... | 235/435 |
| 2007/0046466 A1* | 3/2007 | Sakama et al. ............. | 340/572.1 |
| 2007/0103310 A1* | 5/2007 | Hopman et al. ............ | 340/572.8 |
| 2007/0131781 A1 | 6/2007 | Roth et al. | |
| 2007/0159341 A1* | 7/2007 | Chang et al. ............... | 340/572.8 |
| 2008/0001280 A1* | 1/2008 | Kusumoto et al. ............ | 257/692 |
| 2008/0143480 A1* | 6/2008 | Egbert et al. ................ | 340/10.1 |

FOREIGN PATENT DOCUMENTS

| | | |
|---|---|---|
| JP | 2000-339424 A | 12/2000 |
| JP | 2006-18421 A | 1/2006 |
| JP | 2006-031336 | 2/2006 |
| JP | 2006-164249 | 6/2006 |
| JP | 2007-094977 A | 4/2007 |
| JP | 2007-156640 | 6/2007 |
| JP | 2007-157140 A | 6/2007 |
| JP | 2007-168883 A | 7/2007 |
| WO | WO 2006066787 A1 * | 6/2006 |

OTHER PUBLICATIONS

Notification of Reasons for Refusal dated Nov. 27, 2012 corresponding to Japanese Patent Application No. 2008-216205 and English translation thereof.

* cited by examiner

*Primary Examiner* — Michael G Lee
*Assistant Examiner* — Matthew Mikels
(74) *Attorney, Agent, or Firm* — Squire Sanders (US) LLP

(57) ABSTRACT

A radio frequency identification tag includes a substrate, and an antenna pattern disposed on an outer peripheral side surface of the substrate. An electronic device is electrically connected to the antenna pattern, and is mounted on the outer peripheral side surface of the substrate.

5 Claims, 12 Drawing Sheets

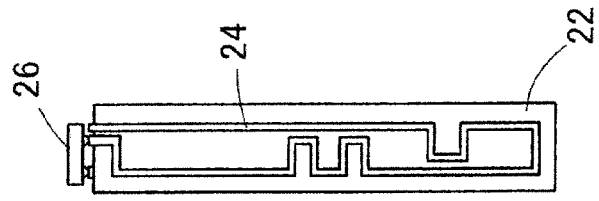
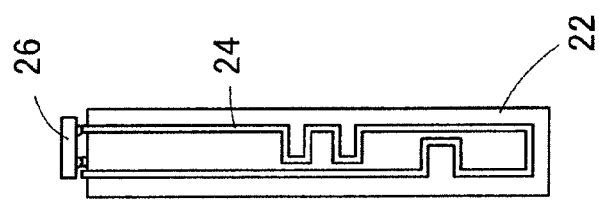
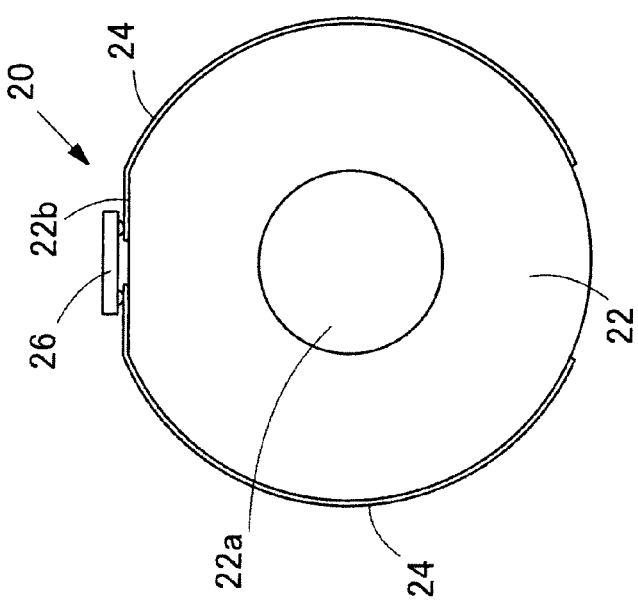
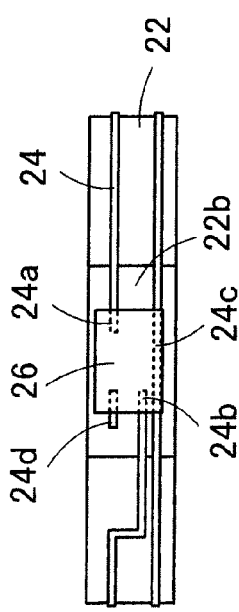

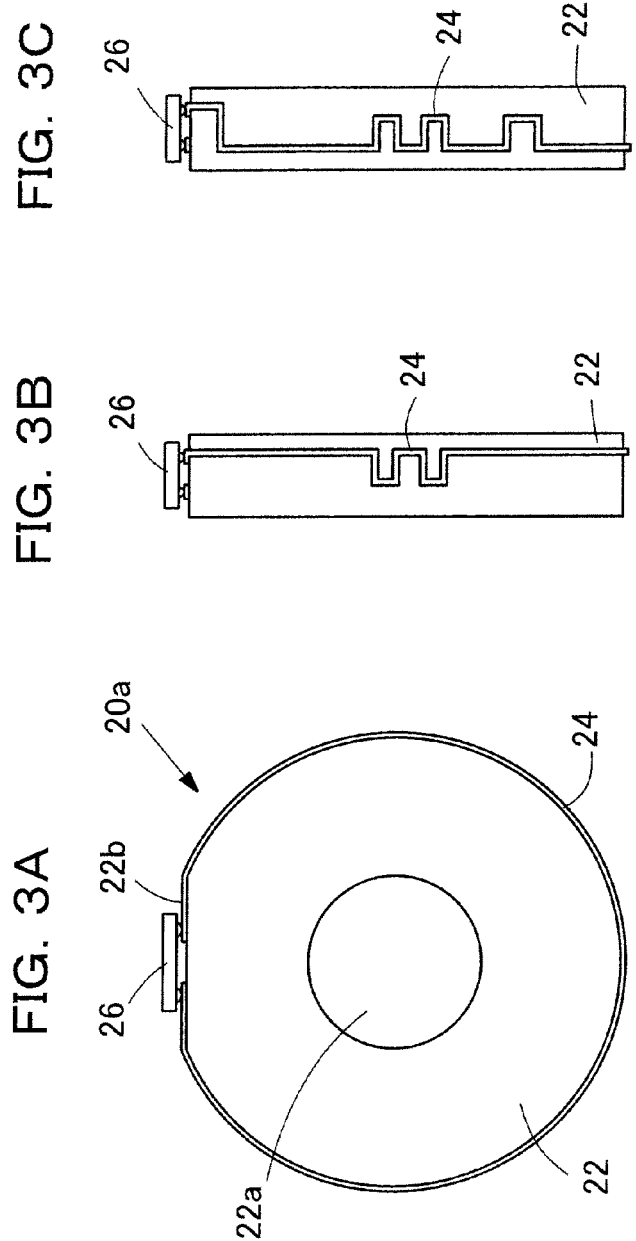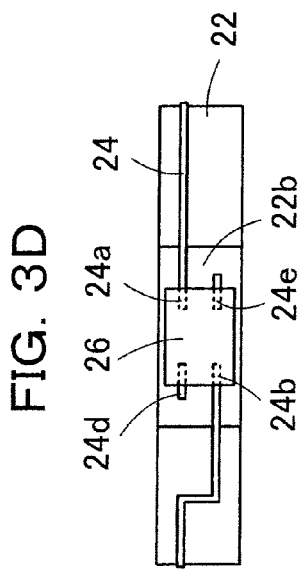

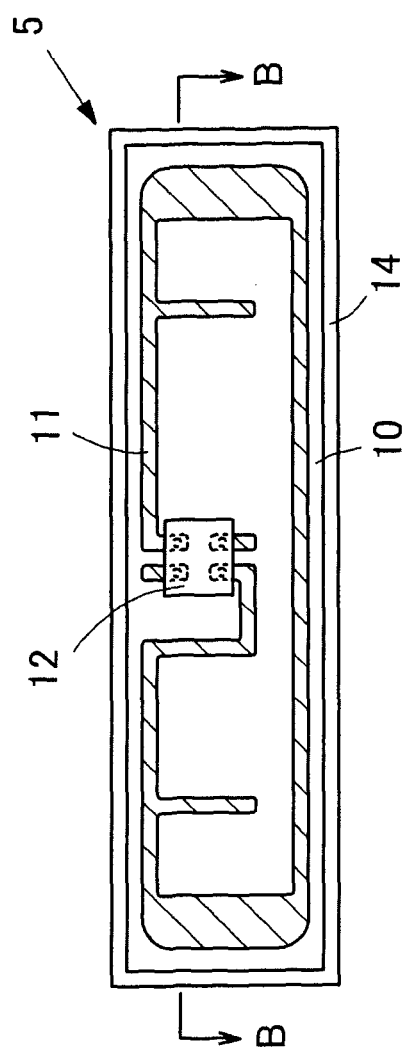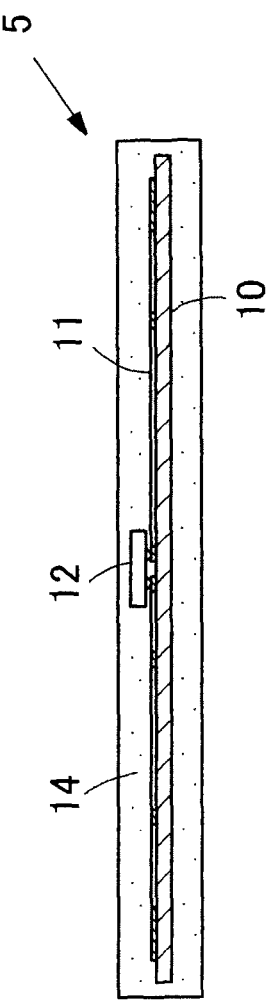
FIG. 12A
FIG. 12B

RADIO FREQUENCY IDENTIFICATION TAG AND METHOD OF MANUFACTURING THE SAME

CROSS-REFERENCE TO RELATED APPLICATIONS

This application is based upon and claims the benefit of priority of the prior Japanese Patent Application No. 2008-216205, filed on Aug. 26, 2008, the entire contents of which are incorporated herein by reference.

BACKGROUND

1. Field

This embodiment relates to a radio frequency identification tag that transmits and receives information in a noncontact manner.

2. Description of the Related Art

The radio frequency identification tag is commercialized as a device for transmitting and receiving information with respect to an electronic device, and is widely used for the purposes of managing goods, etc.

FIGS. 12A and 12B show a radio frequency identification tag 5 having an IC (integrated circuit) chip 12 mounted on a substrate 10 formed into a flat plate, respectively. FIGS. 12A and 12B show a plan view and a cross-sectional view of the radio frequency identification tag 5, respectively.

The radio frequency identification tag 5 is configured such that an antenna pattern 11 is formed on the substrate 10 made of resin, the IC chip 12 is mounted thereon so as to be connected to the antenna pattern 11, and the substrate 10, the antenna pattern 11, and the IC chip 12 are coated with a jacket material 14.

In manufacturing the radio identification tag 5 shown in FIGS. 12A and 12B, while a roll of substrate having a wide and long configuration is conveyed as to be flatly unrolled, devices such as IC chips are mounted on the substrate, and the substrate is divided into a plurality of pieces. Thereafter, both surfaces of each piece of substrate are coated with the jacket material 14 into a commercial product. The antenna patterns 11 are formed as repetitive patterns on the roll of wide and long substrate in advance, and the IC chips are mounted on the antenna patterns 11 with being aligned with those antenna patterns 11 into the products.

Related art is described, for example, in Japanese Laid-open Patent Publication No. 2006-031336,
Japanese Laid-open Patent Publication No. 2006-164249, and
Japanese Laid-open Patent Publication No. 2007-156640

The above-described wide roll in use is as wide as 1 or 2 m for the purposes of mass-producing the radio frequency identification tags. In the manufacturing process, a process of forming the antenna patterns on the long substrate, a process of mounting the IC chips on the substrate, and a process of cutting out the substrate into individual pieces and externally packaging each piece separate from each other, resulting in such a problem that those processes cannot be lumped in the manufacturing. Also, since the wide roll is employed, there arises such a problem that a large-scaled manufacturing facility is required.

SUMMARY

According to one embodiment of the invention, a radio frequency identification tag includes a substrate, and an antenna pattern disposed on an outer peripheral side surface of the substrate. An electronic device is electrically connected to the antenna pattern, and is mounted on the outer peripheral side surface of the substrate.

In another embodiment, the invention includes a method of manufacturing a radio frequency identification tag. The method includes forming a plurality of antenna patterns on an outer peripheral side surface of a bar of substrate material. The substrate material has a cross-sectional configuration that coincides with a front configuration of a substrate of the radio frequency identification tag at given interval set in an axial direction of the substrate material. A plurality of electronic devices are mounted on the substrate material. The electronic devices are electrically connected to the antenna patterns, respectively. The substrate material on which the electronic devices are mounted is cut at the given intervals, perpendicular to the axial direction of the substrate material.

In another embodiment, a radio frequency identification tag comprises a substrate, and an antenna pattern means for transmitting or receiving electrical signals disposed on an outer peripheral side surface of the substrate. Electronic device means for performing electronic functions is electrically connected to the antenna pattern, and is mounted on the outer peripheral side surface of the substrate.

BRIEF DESCRIPTION OF THE DRAWINGS

FIGS. 2A, 2B, 2C, and 2D are a front view, a right side view, a left side view, and a plan view showing a radio frequency identification tag, respectively;

FIGS. 3A, 3B, 3C and 3D are a front view, a right side view, a left side view, and a plan view showing a radio frequency identification tag in another example of an antenna pattern, respectively;

FIGS. 12A and 12B are a plan view and a cross-sectional view showing a conventional configuration of an IC tag.

DETAILED DESCRIPTION

Figure 1A:
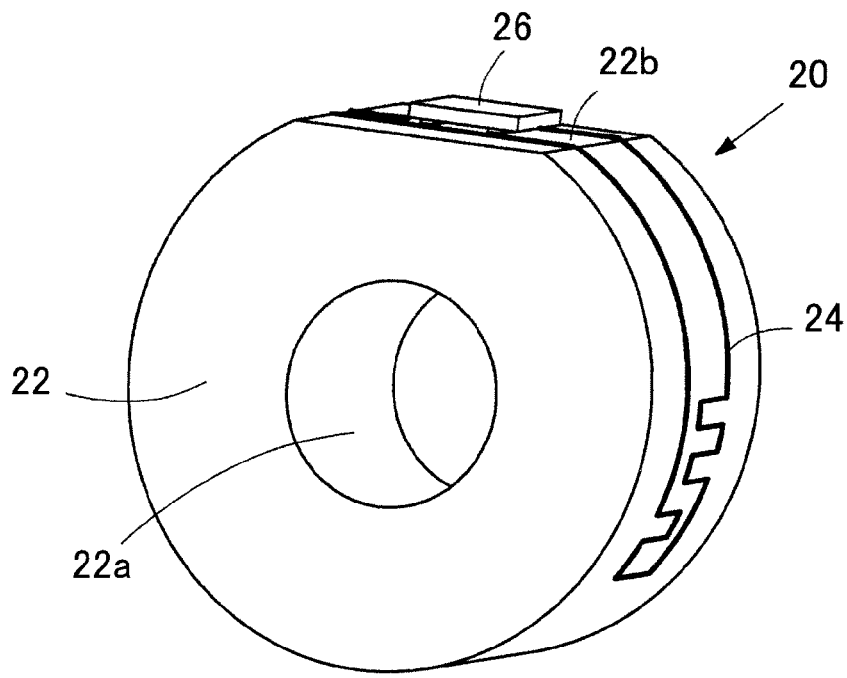
FIGS. 1A and 1B are perspective views showing an IC tag, respectively.
Figure 1B:
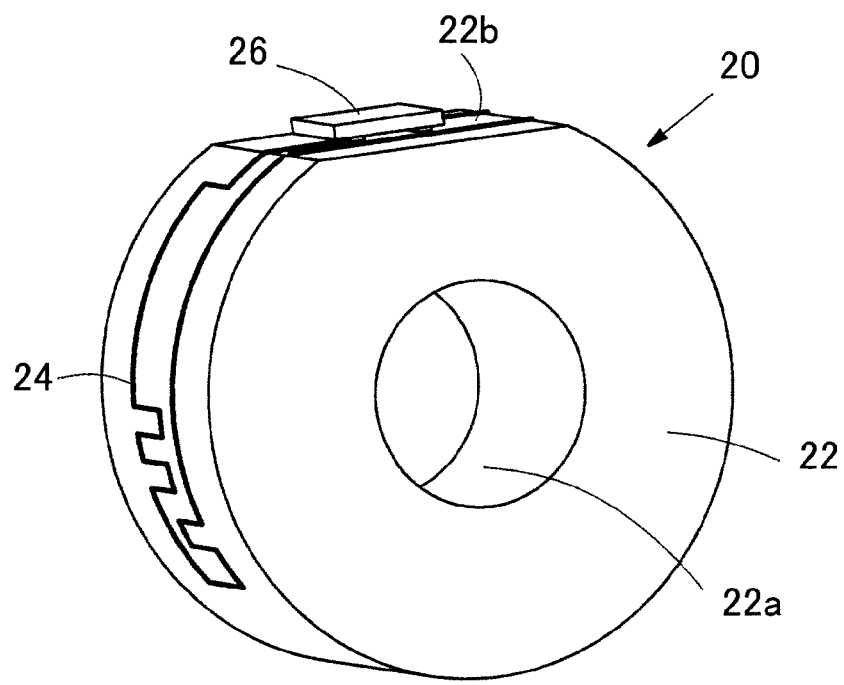

FIG. 1A is a perspective view showing a radio frequency identification tag 20 viewed from right according to one embodiment, and FIG. 1B is a perspective view showing the radio frequency identification tag 20 viewed from left. The radio frequency identification tag 20 according to this embodiment can include a substrate 22 formed into a flat disk, an antenna pattern 24 formed along an outer peripheral side surface of the substrate 22, and an IC chip 26 mounted on an outer side surface of the substrate 22 with electric connection to the antenna pattern 24.

The substrate 22 can be formed as a support that supports the antenna pattern 24 and the IC chip 26 so as to be electrically insulated therefore. In order to support the antenna pattern 24 to the substrate 22 in an electrically isolating manner, the substrate 22 can be made of an insulator. An insulating material of the insulator to be used for the substrate 22 can include various resin materials or glass-fiber reinforced resin materials each having electric insulation properties such as epoxy resin or polyimide resin, or the like. The insulating material can be substituted for the an electric conductor such as metal, a surface of which is coated with an electric insulating material such as epoxy resin.

In the radio frequency identification tag 20 of this embodiment, a through-hole 22a passes through the substrate 22 in a thickness direction thereof for the purpose of facilitating attachment of the radio frequency identification tag 20 to goods.

The antenna pattern 24 is formed on the outer peripheral side surface of the substrate 22, that is, within a thickness area of the side surface of the substrate 22. The planar configuration, for example in a radial dimension, and thickness of the substrate 22 can be appropriately selected.

A size of the substrate 22 is determined according to a size of the IC chip 26 mounted on the radio frequency identification tag 20, and a length of the antenna pattern 24 required as the radio frequency identification tag 20. The dimensions of the radio frequency identification tag typically used are about 5 to 20 mm in radial dimension and about 0.5 to 2 mm in thickness.

In FIGS. 1A and 1B, the thickness of the substrate 22 is relatively thickly drawn for description. Even if the line width of the antenna pattern 24 is about 0.1 mm, and the thickness of the substrate 22 is about 1 mm, the antenna pattern 24 can be readily formed on the outer peripheral side surface of the substrate 22.

As a method of forming the antenna pattern 24, there can be applied a method of coating an electrically conductive adhesive is in a given pattern by a coating nozzle, a method of printing the electrically conductive adhesive in a given pattern through a printing process, a method of depositing a conductor layer such as copper foil on the outer peripheral side surface of the substrate 22, and etching the conductor layer in a given pattern, etc.

FIGS. 2A to 2D are a front view, a right side view, a left side view, and a plan view of the radio frequency identification tag 20 shown in FIGS. 1A and 1B. The radio frequency identification tag 20 according to this embodiment can be configured such that the antenna pattern 24 is distributed to the outer peripheral side surfaces of right and left nearly-half-rounds that sandwich a position where the IC chip 26 is mounted there between. FIG. 2B shows a part of the antenna pattern 24 formed on a right half of the substrate 22, and FIG. 2C shows a part of the antenna pattern 24 formed on a left half of the substrate 22. The antenna pattern 24 can be so formed as to be bent at midway positions of the pattern as shown in the figures.

FIG. 2D shows a state in which a position of the IC chip 26 that is mounted on the substrate 22 viewed from a planar direction.

The IC chip 26 is mounted on a flat part 22b formed on the outer peripheral side surface of the substrate 22. In order to electrically connect the antenna pattern 24 to the IC chip 26, ends of the pattern extend up onto the flat part 22b. In an example shown, one end 24a and another end 24b of the antenna pattern 24 are electrically connected to terminals of the IC chip 26. A pattern part 24c that transverses the flat part 22b is a pattern part that connects the right and left antenna patterns 24 together.

The reason that the flat part 22b is formed on the substrate 22, and the IC chip 26 is mounted on the flat part 22b is because the IC chip 26 can be mounted so as to be surely electrically connected to the antenna pattern 24. The IC chip 26 has two terminals connected to the antenna pattern 24, and two dummy terminals. A dummy pattern 24d is positioned at the dummy terminals so that the IC chip 26 is flatly mounted on the antenna pattern 24.

In this embodiment, the antenna pattern 24 arranged to be distributed to right and left with respect to the position where the IC chip 26 is mounted is arranged to connect between one terminal and another terminal of the IC chip 26 as a closed loop. The antenna pattern 24 is not formed into the closed loop as described above, but the antenna pattern 24 arranged to be distributed to right and left of the IC chip 26 can be formed as patterns independent of each other.

FIGS. 3A to 3C show an example of a radio frequency identification tag 20a in which the antenna pattern 24 is arranged around the outer peripheral side surface of the substrate 22. In this embodiment, one end 24a of the antenna pattern 24 is connected to one end of the IC chip 26, and another end 24b of the antenna pattern 24 going around the outer peripheral side surface of the substrate 22 is connected to another terminal of the IC chip 26. Dummy patterns 24d and 24e are so formed as to correspond to the dummy terminals of the IC chip 26.

As shown in FIGS. 1A and 1B, the radio frequency identification tag 20 is supplied as a product in a state where the antenna pattern 24 is formed on the outer peripheral side surface of the substrate 22, and the IC chip 26 is mounted thereon. In order to enhance the protective performance and durability of the IC chip 26, after the IC chip 26 is joined to the antenna pattern 24, a joint of the IC chip 26 and the antenna pattern 24 may be sealed with an underfill material. Also, after mounting of the IC chip 26, a sealant may be supplied to an area of the flat part 22b on which the IC chip 26 is mounted so as to cover an outer surface of the IC chip 26 such that the IC chip 26 is covered with the sealant.

Figure 4:
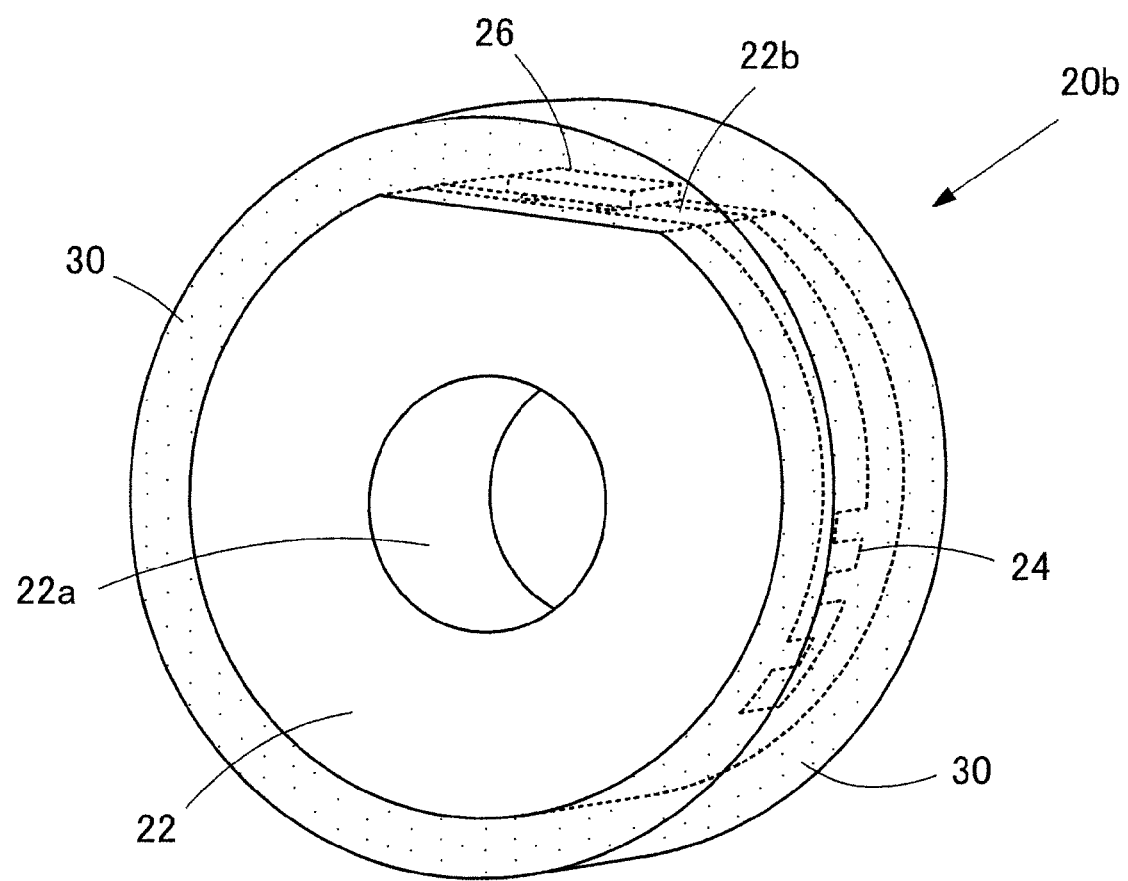
FIG. 4 is a perspective view showing the radio frequency identification tag in which an outer peripheral side surface of a substrate is sealed with a sealant.

FIG. 4 shows a radio frequency identification tag 20b in which the entire surface of the outer peripheral side surface of the substrate 22 is covered with a sealant 30. The sealant 30 is disposed to seal the antenna pattern 24 and the IC chip 26 along the outer peripheral side surface of the substrate 22. In the radio frequency identification tag 20b of this embodiment, both end surfaces (flat parts) of the substrate 22 are exposed, however, the exposed parts of the substrate 22 can be also covered with the sealant 30.

As in the embodiment shown in FIG. 4, the antenna pattern 24 and the IC chip 26 are sealed with the sealant 30, thereby enabling the antenna pattern 24 and the IC chip 26 to be adequately protected, and enabling the durability of the radio frequency identification tag to be improved. An appropriate material having electrical insulation such as urethane rubber is used for the sealant 30.

Figure 5A:
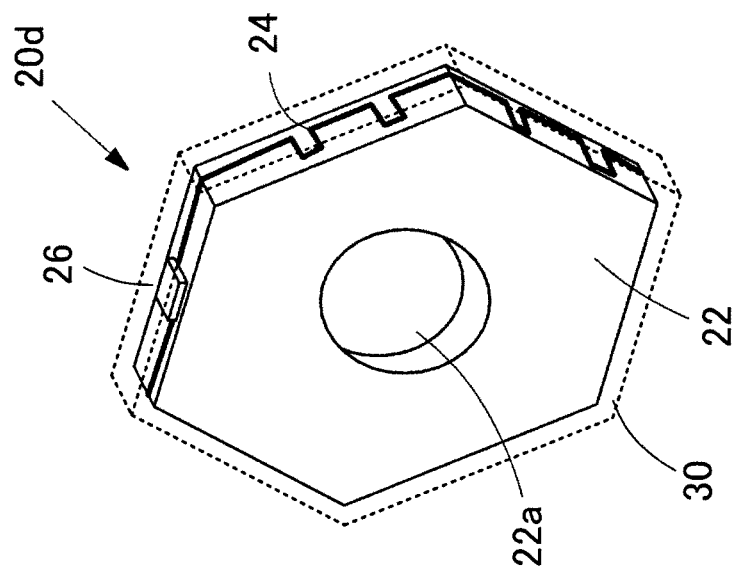
FIGS. 5A and 5B are perspective views showing another configuration example of the radio frequency identification tag, respectively.
Figure 5B:
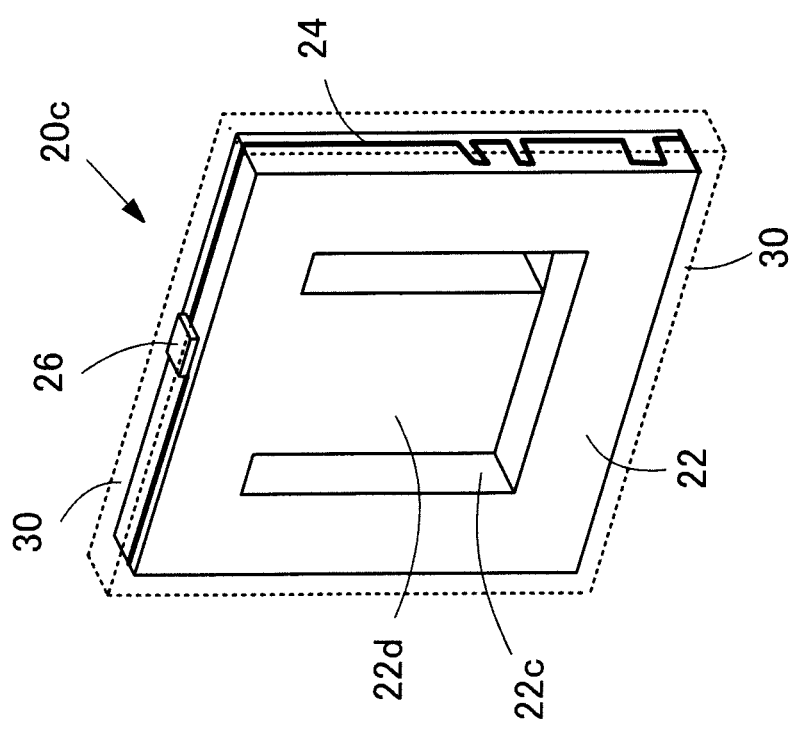

FIGS. 5A and 5B show an example in which a front configuration of the substrate 22 is formed into a polygon such as a rectangle, according to another embodiment of the radio frequency identification tag. A radio frequency identification tag 20c shown in FIG. 5A is an example in which the substrate 22 is a configuration which is square in front. A U-shaped through-hole 22c is defined in the substrate 22, and a clip piece 22d is formed in the central part of the substrate 22. The antenna pattern 24 is formed on the outer peripheral side surface of the substrate 22, the IC chip 26 is mounted on one side of the substrate 22, and the IC chip and the antenna pattern 24 are electrically connected to each other. Similarly, in this embodiment, the outer peripheral side surface of the substrate 22 can be configured to be coated with the sealant 30 so that the antenna pattern 24 and the IC chip 26 are sealed with the sealant 30.

A radio frequency identification tag 20d shown in FIG. 5B is an example in which the front configuration of the substrate 22 is formed into a regular hexagon. The antenna pattern 24 is formed on the outer peripheral side surface of the substrate 22, and the IC chip 26 mounted on one side of the substrate 22 and the antenna pattern 24 are electrically connected to each other. Similarly, in this embodiment, the outer peripheral side surface of the substrate 22 can be sealed with the sealant 30 so that the antenna pattern 24 and the IC chip 26 are sealed with the sealant 30.

The radio frequency identification tags 20c and 20d shown in FIGS. 5A and 5B facilitate increased security in the mounting of the IC chip 26, as compared with a case in which the IC chip 26 is mounted on the curved surface. The side surface of the substrate 22 on which the IC chip 26 is mounted is flat, which can result in better adhesion. Also, the radio frequency identification tags 20c and 20d shown in FIGS. 5A and 5B may be manufactured more efficiently than the radio frequency identification tag 20 having a curved outer side surface, depending on a method of manufacturing the antenna pattern 24.

In the example where the substrate 22 is equipped with the clip piece 22d as in the radio frequency identification tag 20c shown in FIG. 5A, when the radio frequency identification tag 20c is attached to goods, the former can be easily attached to the latter with the aid of the clip piece 22d. FIG. 5B shows an example having the circular through-hole 22a, and the size, the number, and the position of arranged through-holes 22a can be appropriately selected. Also, in attachment of the radio frequency identification tag, there can be applied a method of fixing the radio frequency identification tag to goods with a screw by the aid of the through-hole 22a. Also, the substrate 22 formed into a simple flat plate without provision of the through-hole in the substrate 22 can be used for the radio frequency identification tag in certain applications.

In the above embodiment, one IC chip 26 is mounted on the substrate 22. The number of IC chips 26 mounted on one substrate 22 is not limited to one, but a plurality of IC chips 26 can be mounted on one substrate 22. For example, in the radio frequency identification tags 20c and 20d shown in FIGS. 5A and 5B, the IC chips 26 can be mounted on opposed sides, respectively, if suitable for a particular application.

The radio frequency identification tag according to this embodiment can be supplied as a thin and compact radio frequency identification tag product since the antenna pattern 24 is formed on the outer peripheral side surface of the substrate 22 formed into a thin flat plate, and the IC chip 26 is mounted on the outer peripheral side surface of the substrate 22. Also, neither of the antenna pattern 24 and the IC chip 26 is arranged on a planar region (front region) of the substrate 22. Therefore, the through-hole 22a or 22c can be defined in the planar region of the substrate 22, thereby making it possible to easily handle the radio frequency identification tag, that is, to easily attach the radio frequency identification tag onto goods.

Figure 6:
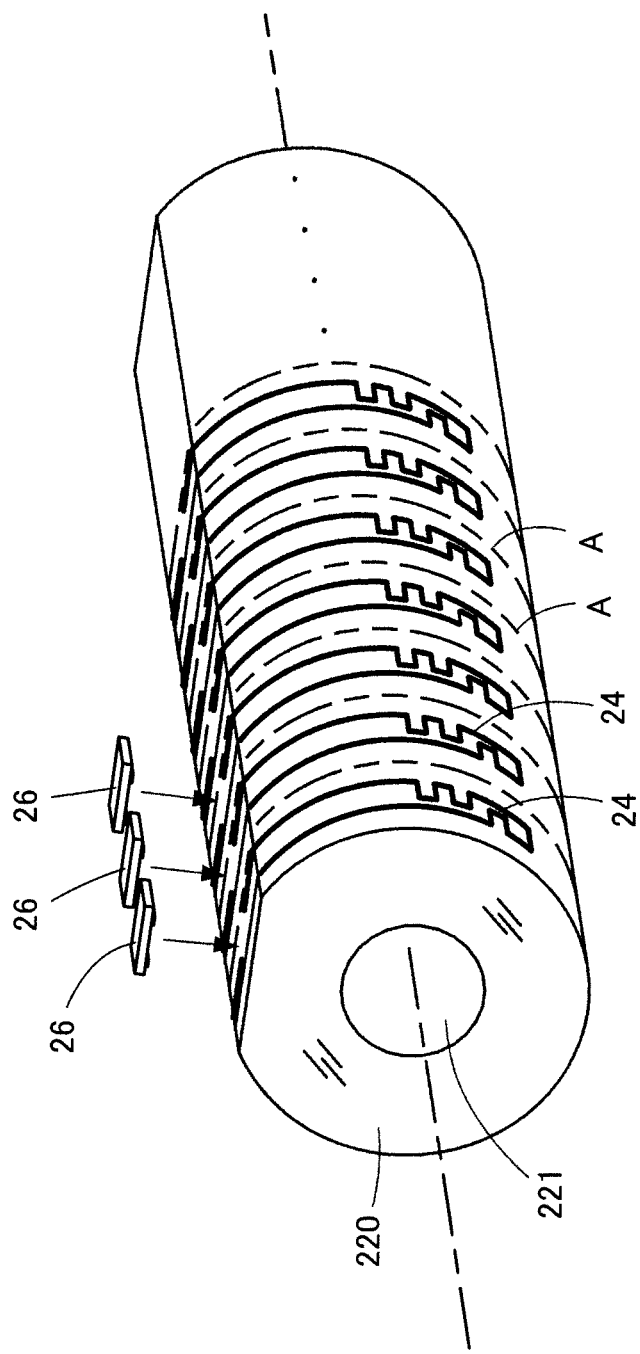
FIG. 6 is a perspective view showing a state in which the antenna pattern is formed on an outer peripheral side surface of a substrate material.

FIG. 6 shows a method of manufacturing the radio frequency identification tag 20 shown in FIG. 1. In the manufacturing method, the radio frequency identification tag 20 is produced with the antenna pattern 24 formed by using an electrically conductive adhesive.

FIG. 6 shows a method of manufacturing the radio frequency identification tag 20 in such a manner that a plurality of antenna patterns 24 are formed on an outer peripheral side surface of a substrate material 220 formed into a straight round bar through which a through-hole 221 is defined in an axial direction thereof, and a plurality of IC chips 26 are positioned at the corresponding antenna patterns 24 so as to be mounted thereon.

The substrate material 220 is cut out at given intervals in the axial direction to produce a plurality of substrates 22 of the individual radio frequency identification tags 20. Positions indicated by lines A are cutting positions of the substrate material 220.

The substrate material 220 is configured so that a cross-sectional shape of the substrate material 220 along a plane perpendicular to the axial direction coincides with the front shape of the substrate 22 in the radio frequency identification tag 20. Since the through-hole 22a can be defined at the central position of the substrate 22 in the radio frequency identification tag 20, the through-hole 221 is defined at the axial position of the substrate material 220. Also, the IC chip 26 is mounted on the flat part 22b of the substrate 22. Accordingly, a flat part 222 is formed on the outer side surface of the substrate material 220 with a configuration where a part of the outer peripheral side surface of the substrate material 220 is notched.

A material of the substrate material 220 can be selected from a material appropriate for the substrate 22. When a resin material such as epoxy resin or polyimide resin is used, it is easy to shape the substrate material 220 into a round bar having a given radial dimension, the through-hole 221, and the flat part 222. A large number of radio frequency identification tags 20 are produced by one substrate material 220. Therefore, the length of the substrate material 220 is set taking the handling easiness during manufacturing into consideration.

FIGS. 7A, 7B to 9A, and 9B show a process of manufacturing the radio frequency identification tag 20 (a process of forming the antenna pattern).

Figure 7A:
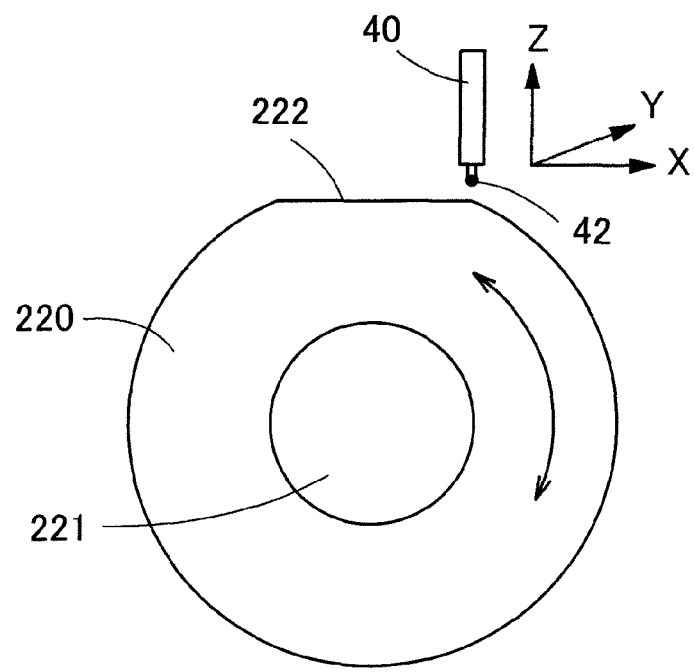
FIGS. 7A and 7B are a front view and a side view showing a process of manufacturing the IC tag, respectively.
Figure 7B:
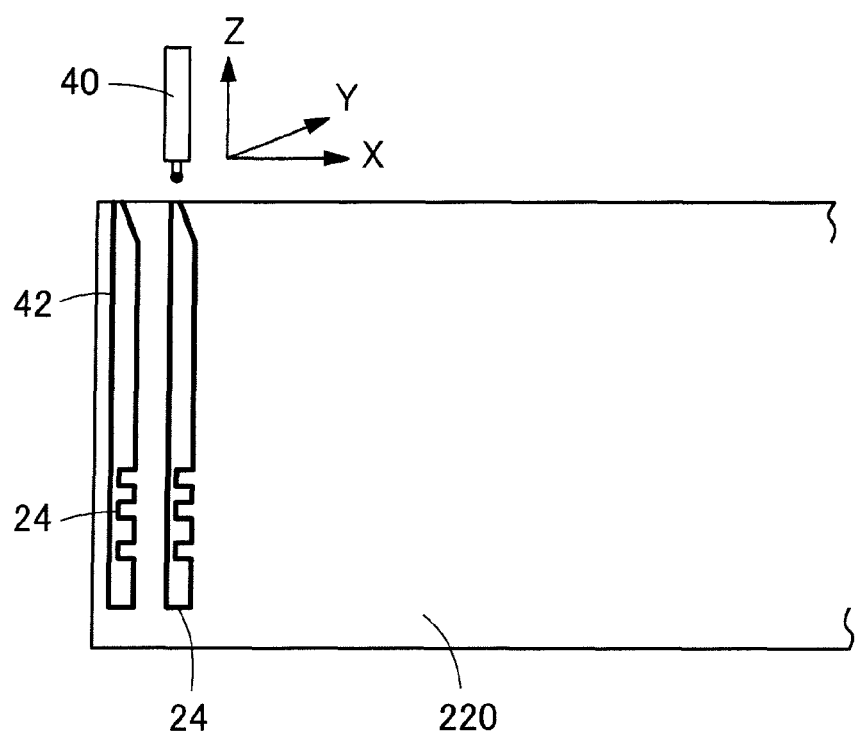

FIGS. 7A and 7B show a process of forming the antenna patterns 24 on the outer peripheral side surface of the substrate material 220. FIG. 7A shows a state where the substrate material 220 is viewed from an end surface direction, and FIG. 7B shows a state where the base material 220 is viewed from a side surface direction.

In this embodiment, the antenna patterns 24 are formed on the outer peripheral side surface of the substrate material 220 by means of a dispense nozzle 40 for electrically conductive adhesive 42, which are supported by a hand to be driven in X, Y, and Z directions under the control, and a drive part that rotationally drives the base material 220 about the axial line.

The method of coating, or drawing the antenna patterns on, the outer peripheral side surface of the base material 220 with the electrically conductive adhesive 42 is executed by combining the operation of rotating the substrate material 220 about the axial line with the operation of moving the dispense nozzles 40 in the X, Y, and Z directions. According to this method, even if the outer peripheral side surface of the substrate material 220 is curved, the antenna patterns 24 can be easily formed in an arbitrary pattern. That is, it is possible to form each antenna pattern 24 to be distributed to both sides of a location where the corresponding IC chip 26 is mounted, form the antenna pattern 24 to be arranged around the outer peripheral side surface of the substrate material 220, and form the antenna pattern 24 in a bent pattern.

Besides, when the substrate 22 is formed into a polygon such as a rectangle or a hexagon as shown in FIGS. 5A and 5B, the antenna pattern 24 can be formed on the outer peripheral side surface of the substrate 22 in a given pattern according to this method.

As shown in FIG. 7B, when the antenna patterns 24 are formed on the outer peripheral side surface of the substrate material 220, the antenna patterns 24 can be formed at given intervals in the axial direction of the substrate material 220. The given intervals at which the antenna patterns 24 are arranged in the axial direction correspond to the thickness of the individual radio frequency identification tags 20 which are cut out from the substrate material 220.

All of the antenna patterns 24 repetitively formed in the axial direction of the substrate material 220 do not always need to be formed in the same pattern, but are typically formed in the same repetitive pattern.

As described above, in the method of drawing the antenna patterns 24 with the electrically conductive adhesive 42 by using the dispense nozzles 40, the electrically conductive adhesive 42 which can be, for example, about 0.1 mm in width can be coated on the outer peripheral side surface. Accordingly, in the method of forming the antenna patterns 24 by using the dispense nozzles 40, each antenna pattern 24 can be formed within an extremely fine (thickness) region.

The antenna patterns 24 can be formed by using one dispense nozzle 40 while the dispense nozzle 40 is sequentially periodically fed in the axial direction. Alternatively, a plurality of dispense nozzles 40 are arranged at given intervals in the axial direction of the substrate material 220, respectively, and each dispense nozzle 40 is driven under the control within a region where the dispense nozzle 40 is arranged, thereby enabling each antenna pattern 24 to be drawn.

Figure 8A:
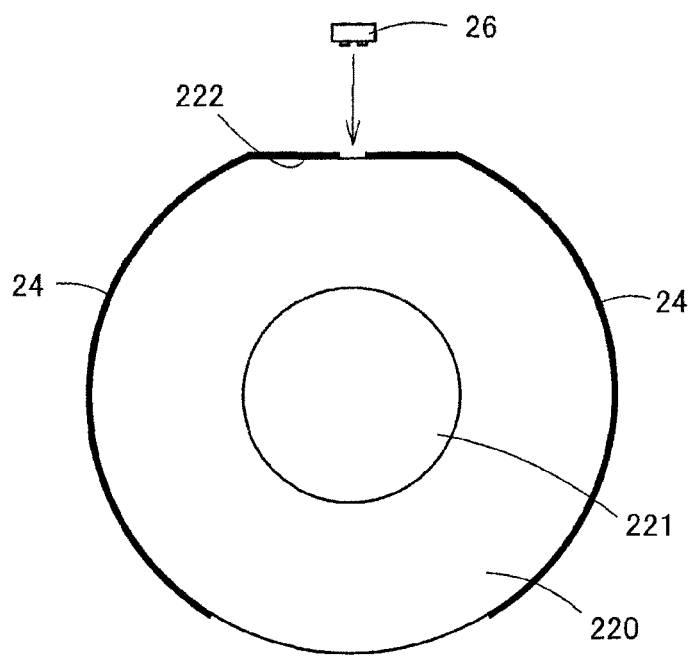
FIGS. 8A and 8B are a front view and a side view showing a process of manufacturing the IC tag, respectively.
Figure 8B:
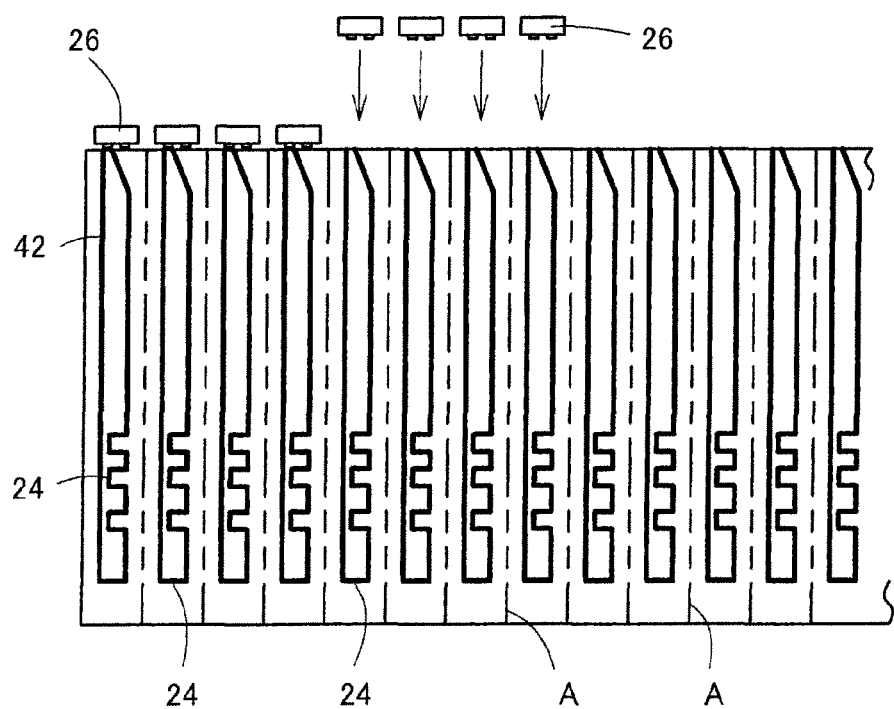

FIGS. 8A and 8B show the operation of mounting the IC chips 26 after the antenna patterns 24 are formed in such a manner that the antenna patterns 24 are drawn with the electrically conductive adhesive 42 at given intervals in the axial direction of the base material 220.

The IC chips 26 can be positioned at the antenna patterns 24 so as to be mounted on the flat part 222 of the substrate material 220, respectively. The operation of mounting the IC chip 26 is executed in a state where the electrically conductive adhesive 42 is uncured. The IC chips 26 are positioned at the antenna patterns 24 and brought into press contact with the antenna patterns 24 whereby the IC chips 26 are electrically connected to the antenna patterns 24.

After the IC chips 26 are positioned at the antenna patterns 24 and mounted on the flat part 222, the electrically conductive adhesive 42 is so heated as to be thermally cured, the antenna patterns 24 are surely deposited on the outer peripheral side surface of the substrate material 220, and the antenna patterns 24 and the IC chips 26 are securely connected to each other, respectively.

Figure 9A:
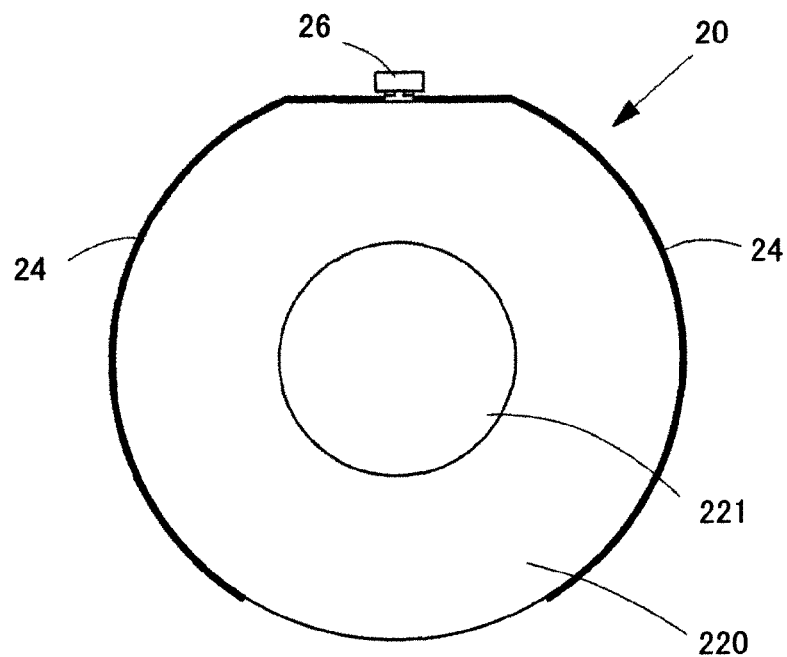
FIGS. 9A and 9B are a front view and a side view showing a process of manufacturing the IC tag, respectively.
Figure 9B:
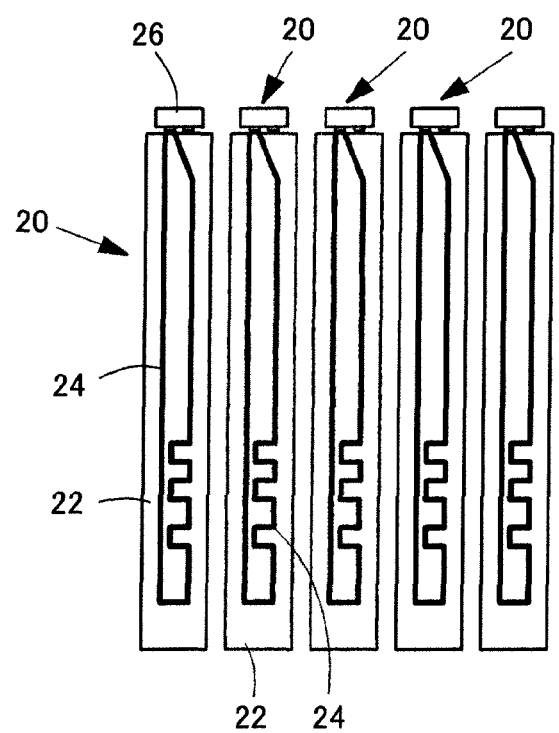

FIGS. 9A and 9B show a process of forming the individual radio frequency identification tags 20 by cutting out the substrate material 220 at given intervals in the axial direction after the electrically conductive adhesive 42 is thermally cured.

The substrate material 220 can be cut perpendicular to the axial direction of the substrate material 220 at respective intermediate positions of the adjacent antenna patterns 24 and IC chips 26 as cutting positions where the substrate material 220 is cut. Positions indicated by lines A in FIG. 8B are representative of cutting positions of the substrate material 220. The substrate material 220 is cut into individual radio frequency identification tags 20 shown in FIGS. 1A and 1B.

Figure 10:
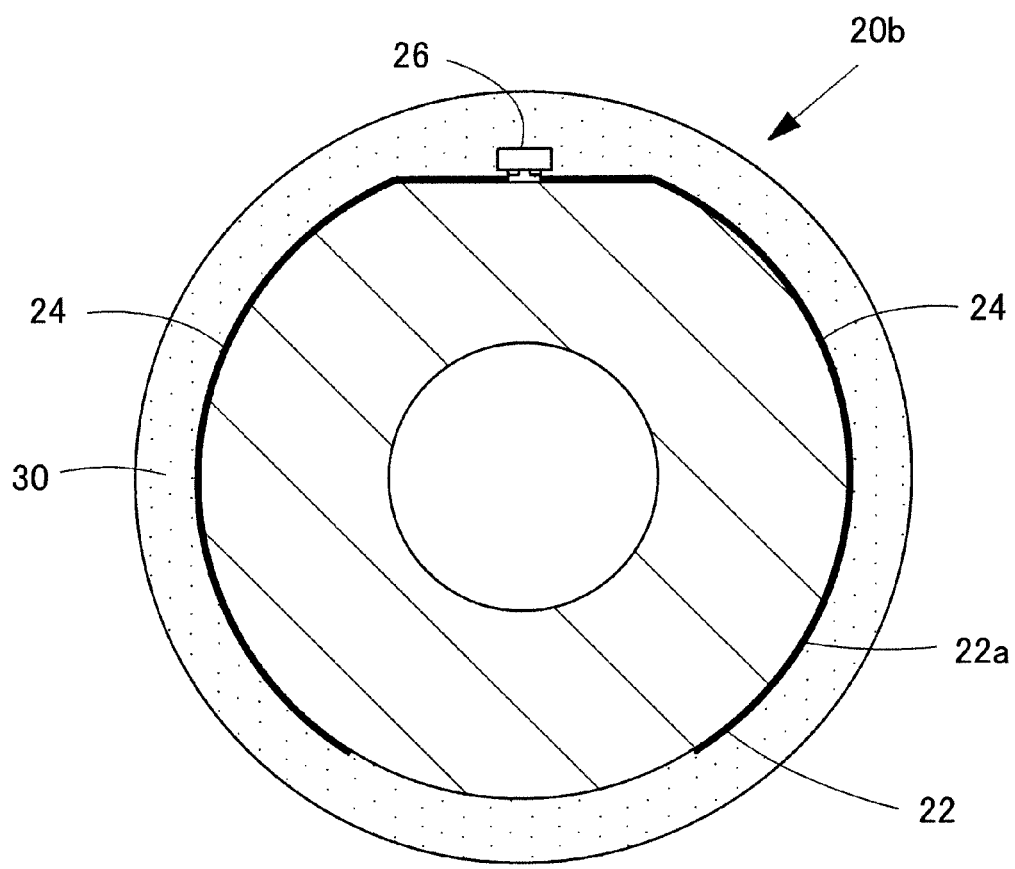
FIG. 10 is a cross-sectional view showing the radio frequency identification tag in which the outer peripheral side surface of the substrate is sealed with the sealant.

In forming the radio frequency identification tag 20b in which the antenna pattern 24 and the IC chip 26 are sealed with the sealant 30, it is only necessary that after the plurality of IC chips 26 have been mounted on the substrate material 220, the entire outer peripheral side surface of the substrate material 220 is sealed with the sealant 30, and the substrate material 220 is cut together with the sealant 30 at given intervals in the axial direction. For example, the outer peripheral side surface of the substrate material 220 is covered with thermosetting epoxy resin in a coating manner, and the substrate material 220 is cut together with the sealant 30 after epoxy resin is thermally cured. FIG. 10 shows a radio frequency identification tag 20b obtained by cutting the substrate material 220 together with the sealant 30 after the outer peripheral side surface of the substrate material 220 is sealed with the sealant 30.

In this embodiment, there is applied a method of forming the antenna patterns 24 by using the electrically conductive adhesive 42, thereby making it possible to form the antenna pattern 24 into a fine pattern. This enables the radio frequency identification tag to be downsized and thinned. The movement of the dispense nozzle 40 can be controlled as to form the antenna pattern 24 in an arbitrary pattern. That the antenna pattern 24 can be formed into an arbitrary pattern is advantageous in that the degree of freedom of a design is larger than that in a method of forming the antenna pattern 24 with a mask pattern. The use of the electrically conductive adhesive 42 allows the IC chip 26 to be joined directly to the antenna pattern 24 for mounting the IC chip 26 on the substrate material 220. This facilitates the mounting of the IC chip 26.

Also, the process of forming the antenna patterns 24 on the outer peripheral side surface of the substrate board 220, the process of mounting the IC chips 26 on the antenna patterns 24, and the process of segmenting the substrate material 220 into pieces to form the radio frequency identification tags 20 in the method of manufacturing the radio frequency identification tag according to this embodiment can be executed as a series of manufacturing processes for manufacturing the radio frequency identification tags. As a result, it is possible to readily mass-produce such radio frequency identification tags.

Further, since the substrate material 220 is formed into a thin bar, the radio frequency identification tag can be produced without using a large-scale manufacturing facility as compared with a case of treating with a wide roll body as in the related art.

In the above manufacturing process, in order to form the radio frequency identification tag 20 with the circular through-hole 22a, the substrate material 220 with the circular through-hole 221 is used. In the case of manufacturing the radio frequency identification tag with the U-shaped through-hole 22c shown in FIG. 5A, the substrate material 220 through which the through-hole U-shaped in front configuration passes may be used. Also, in the case of manufacturing the radio frequency identification tag with the substrate 22 whose front configuration is rectangular or polygonal, it is only necessary to prepare the substrate material 220 rectangular or polygonal in a cross-sectional configuration perpendicular to the axial direction.

In the above embodiment, in order to form the antenna pattern 24 by using the electrically conductive adhesive 42, a given pattern is drawn with the electrically conductive adhesive 42 through the dispense nozzle 40. As a technique of forming the antenna pattern 24 with the electrically conductive adhesive 42, the electrically conductive adhesive 42 can be formed into the given pattern through a printing process. The application of the printing process is favorable to the manufacturing of the radio frequency identification tag with the substrate 22 whose front configuration is rectangular or polygonal as shown in FIGS. 5A and 5B because a print side is flat.

As a technique of forming the antenna pattern 24 on the outer peripheral side surface of the substrate 22, it is possible that after the outer peripheral side surface of the bar-shaped substrate 220 is coated with a conductive layer such as a copper foil or a copper layer, a surface of the conductive layer is coated with a resist, and the resist is exposed and developed according to a given pattern to form the antenna pattern 24.

In the above respective embodiments, the IC chip 26 whose terminals are directed toward the outer surface of the substrate 22 is typically mounted face down. However, the IC chip 26 can also be mounted face-up.

Figure 11A:
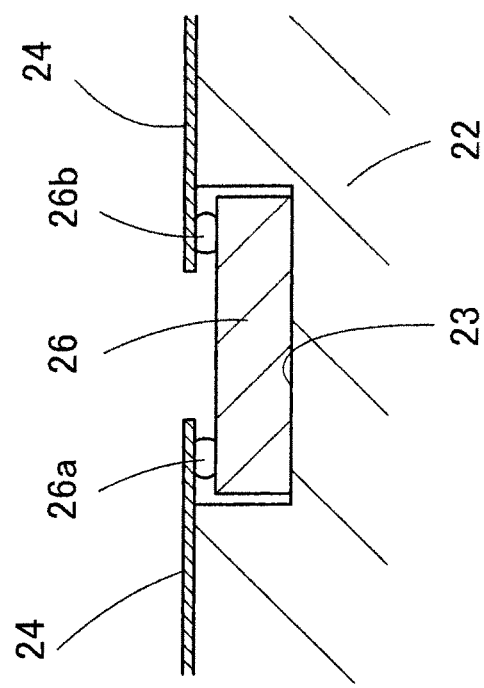
FIGS. 11A and 11B are cross-sectional views showing a method of mounting an IC chip, respectively.
Figure 11B:
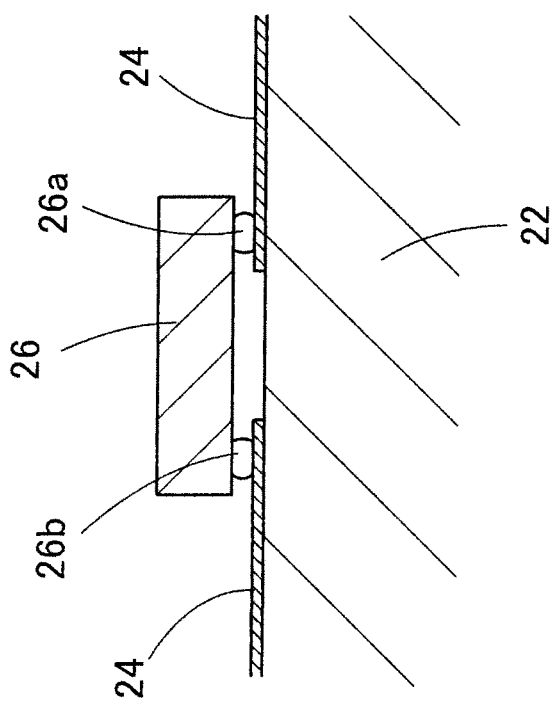

FIG. 11A is an example in which the IC chip 26 is mounted on the substrate 22 face-down, and FIG. 11B is an example in which the IC chip 26 is mounted on the substrate 22 face-up.

In FIG. 11A, terminals 26a and 26b formed on the IC chip 26 are bonded to the antenna pattern 24 made of an electrically conductive adhesive which is formed on the surface of the substrate 22 to mount the IC chip 26 thereon.

In FIG. 11B, when the IC chip 26 is mounted on a recess 23 in the substrate 22 face-up, and the antenna pattern 24 is formed with the electrically conductive adhesive, the antenna pattern 24 extends onto the terminals 26a and 26b of the IC chip 26, thereby electrically connecting the antenna pattern 24 with the IC chip 26.

In a structure in which the IC chip 26 is put in the recess 23 defined in the substrate 22, and the IC chip 26 and the antenna pattern 24 are electrically connected to each other, the IC chip 26 is mounted without projecting from the outer peripheral side surface of the substrate 22. After formation of the antenna pattern 24 electrically connected with the IC chip 26, the outer peripheral side surface of the substrate 22 can be sealed with an insulating resin, or the like. As a result, the IC chip 26 is housed in the substrate 22 for sure protection, and the radio frequency identification tag is further downsized and supplied as a product that is formed into, for example, a circle or coin shape, without the IC chip protruding.

I claim:

1. A method of manufacturing a radio frequency identification tag, comprising:

forming a plurality of antenna patterns on an outer peripheral side surface of a bar of substrate material, the outer peripheral side surface extending along and surrounding the bar in an axial direction, the substrate material having a cross-sectional configuration that coincides with a front configuration of a substrate of the radio frequency identification tag at given intervals set in the axial direction of the bar;

mounting a plurality of electronic devices on the substrate material;

electrically connecting the electronic devices to the antenna patterns, respectively; and cutting the substrate material on which the electronic devices are mounted at the given intervals perpendicular to the axial direction of the substrate material, wherein the forming the plurality of antenna patterns comprises controlling a movement position of a dispense nozzle that discharges an electrically conductive adhesive, and controlling a rotation position of the substrate material about an axial line thereof to form the antenna patterns.

2. A method according to claim 1, wherein said mounting of the plurality of electronic devices comprises mounting a plurality of IC chips.

3. The method of manufacturing a radio frequency identification tag according to claim 1, wherein the mounting of the electronic devices includes mounting the electronic devices in a face-down state.

4. The method of manufacturing a radio frequency identification tag according to claim 1, wherein the mounting of the electronic devices includes mounting the electronic devices in a recess defined on the outer peripheral side surface of the substrate material, with the electronic device disposed face-up, and wherein the forming of the antenna patterns includes electrically connecting the antenna patterns with the electronic devices to form the antenna patterns.

5. The method of manufacturing a radio frequency identification tag according to claim 1, further comprising:

preparing a substrate material to include a through-hole in the axial direction thereof.

* * * * *